United States Patent
Esaka et al.

(10) Patent No.: US 7,948,781 B2
(45) Date of Patent: May 24, 2011

(54) CONTACTLESS POWER RECEIVING UNIT AND ELECTRONIC DEVICE EMPLOYING THE SAME

(75) Inventors: Koichiro Esaka, Moriguchi (JP); Masaaki Konoto, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 596 days.

(21) Appl. No.: 12/125,962

(22) Filed: May 23, 2008

(65) Prior Publication Data

US 2008/0298100 A1    Dec. 4, 2008

(30) Foreign Application Priority Data

Jun. 1, 2007    (JP) ................... 2007-146448

(51) Int. Cl.
*H02M 5/42*    (2006.01)
*H02M 7/44*    (2006.01)
(52) U.S. Cl. ............... 363/67; 363/68; 363/84; 363/89
(58) Field of Classification Search ............. 363/67, 363/68, 84, 89
See application file for complete search history.

(56) References Cited

U.S. PATENT DOCUMENTS

| | | | | |
|---|---|---|---|---|
| 6,134,130 A | * | 10/2000 | Connell et al. | 363/89 |
| 6,307,766 B1 | * | 10/2001 | Ross et al. | 363/144 |
| 7,009,860 B2 | * | 3/2006 | Kazutoshi | 363/98 |
| 2005/0135129 A1 | * | 6/2005 | Kazutoshi | 363/98 |

FOREIGN PATENT DOCUMENTS

| | | |
|---|---|---|
| JP | 2005-525705 A1 | 8/2005 |
| JP | 2005-354197 A1 | 12/2005 |
| JP | 2006-333557 A1 | 12/2006 |

* cited by examiner

*Primary Examiner* — Bao Q Vu
(74) *Attorney, Agent, or Firm* — Marvin A. Motsenbocker; Mots Law, PLLC

(57) ABSTRACT

Provided is a contactless power receiving unit which has a simple configuration, and which is capable of generating constant induced electromotive force regardless of the orientation of a power receiving coil. Multiple power receiving coils are arranged to form certain relative angles to one another in a parallel magnetic field generated by a power supply unit. A rectifier circuit is connected to each power receiving coil. An adder circuit is configured to add DC power obtained, through the rectifier circuits, from the multiple power receiving coils, and to output resultant DC power of the addition.

17 Claims, 11 Drawing Sheets

MAGNETIC FIELD

US 7,948,781 B2

CONTACTLESS POWER RECEIVING UNIT AND ELECTRONIC DEVICE EMPLOYING THE SAME

CROSS REFERENCE TO RELATED APPLICATIONS

This application claims priority based on 35 USC 119 from prior Japanese Patent Application No. P2007-146448 filed on Jun. 1, 2007, the entire contents of which are incorporated herein by reference.

BACKGROUND OF THE INVENTION

1. Field of the Invention

The present invention relates to a contactless power receiving unit employed to obtain necessary power in various electronic devices such as a mobile phone and a personal computer.

2. Description of the Related Art

Various contactless charging units are disclosed in Published PCT application No. JP2005-525705, Japanese Patent Application Publication No. 2006-333557, Japanese Patent Application Publication No. 2005-354197, and the like. Japanese Patent Application Publication No. 2005-354197 discloses a technique of transmitting energy from a primary side power supply unit to a secondary side power receiving unit by a parallel rotating magnetic field.

In a contactless power receiving unit shown in FIG. 12, power supply unit 8 includes AC power source 81, phase control circuit 82, and two power transmitting coils 83. Phase control circuit 82 is configured to divide an AC current provided from AC power source 81 into two current components having a phase difference of 90° from each other. The two components are respectively supplied to two power transmitting coils 83, which thereby cause magnetic fields Bx and By respectively, having a phase difference of 90° from each other. Two power transmitting coils 83 are arranged such that coil axes thereof are orthogonal to each other.

Meanwhile, power receiving unit 9 includes power receiving coil 91 and rectifier circuit 92. Power receiving coil 91 is configured to receive a parallel rotating magnetic field generated in power supply unit 8, and rectifier circuit 92 rectifies the AC power received by power receiving coil 91. The DC power outputted from rectifier circuit 92 is supplied to load 93.

Each of power transmitting coils 83 of power supply unit 8 is configured of multiple rows of conductor wires 14 running parallel on a plane as shown in FIG. 11A, and currents flow in the same direction in these conductor wires 14. With this configuration, a magnetic field is formed so as to surround each conductor wire 14 as shown in FIG. 11B, and magnetic fields of each conductor wire 14 counteract each other between two adjacent conductor wires 14. As a result, parallel magnetic fields are formed to be parallel to a plane in which multiple conductor wires 14 are arranged, as shown in FIG. 1C.

Thereafter, two power transmitting coils 83 are arranged orthogonal to each other, while currents are supplied to two power transmitting coils 83 with 90° phase difference. In this way, the two parallel magnetic fields formed by power transmitting coils 83 are synthesized with each other to form a parallel rotating magnetic field that rotates on the aforementioned plane.

Above-mentioned power supply unit 8 is included in charging pad 80 shown in each of FIGS. 13A and 13B, for example. When power receiving unit 9 is placed on charging pad 80, parallel rotating magnetic field B generated by power supply unit 8 acts upon power receiving coil 91, so that induced electromotive force is generated in this power receiving coil 91. Here, parallel rotating magnetic field B rotates within a plane parallel to charging pad 80. Accordingly, even if power receiving coil 91a is placed on charging pad 80 so as to be rotated by an angle θ, the magnetic field B eventually acts perpendicularly upon power receiving coil 91a by rotation as shown in FIG. 13B. Hence, power can be received regardless of the orientation that power receiving coil 91 is placed.

However, this type of charging unit requires phase control circuit 82 in power supply unit 8 as shown in FIG. 12. Phase control circuit 82 is configured of multiple active circuit elements, which leads to a problem of complication in the circuit configuration.

Moreover, in the case where power receiving coil 91 of power receiving unit rotates by an angle θ, the phase of the amplitude of the voltage induced to power receiving coil 91a is delayed (or preceded, depending on conditions) by θ, as shown by a broken line in FIG. 14. This causes a problem of a difference in charged amounts at arbitrary time points, due to a difference in the amount of induced voltages at the arbitrary time points, depending on the orientation of power receiving coil 91a.

SUMMARY OF THE INVENTION

An aspect of the present invention is a contactless power receiving unit configured to receive a parallel magnetic field generated by a power supply unit and to convert the magnetic field into power to be supplied to a load. The contactless power receiving unit comprises: multiple power receiving coils arranged to have certain relative angles to one another in a parallel magnetic field generated by a power supply unit; a rectifier circuit connected to each of the power receiving coils; and an adder circuit configured to add DC power obtained from the plurality of power receiving coils through the rectifier circuits, and to output the added sum of power.

For example, the number of power receiving coils is two, and the two power receiving coils are arranged to form a 90° or approximately 90° relative angle to each other. Otherwise, the number of the power receiving coils is four, a coil set is configured so that two coils having different polarities are arranged in a manner that the coil axes thereof are coaxial with each other, and two coil sets are arranged to form a 90° or approximately 90° relative angle to each other. Additionally, the multiple power receiving coils are wound to individually different cores, or otherwise are wound to the same core.

The power receiving unit is arranged opposite to the power supply unit configured to generate a parallel magnetic field. Note that the parallel magnetic field generated by the power supply unit is not necessarily the conventional parallel rotating magnetic field, and is an alternating magnetic field having a certain orientation. An induced voltage is generated in each of the power receiving coils when such a parallel magnetic field acts upon multiple power receiving coils.

Here, assume a case where the direction of the parallel magnetic field generated by the power supply unit and coil axes of the power receiving units are not in parallel. Even in this case, a magnetic component perpendicular to the power receiving surface thereof acts upon each power receiving coil. Accordingly, the induced voltage generated in each power receiving coil, that is, the magnetic field detected by each power receiving coil is equal to that obtained by dividing the original magnetic field. For this reason, by composing these induced voltages, it is possible to obtain the same amount of voltage as the induced voltage that is generated when the direction of the coil axes of the power receiving coils are parallel to the parallel magnetic field. Hence, constant power regardless of the orientation of the power receiving unit can be supplied to a load, by adding up, using an adder circuit, DC voltages obtained from the power receiving coils through the rectifier circuits.

Another aspect of the present invention is an electronic device employing a contactless power receiving unit that comprises the aforementioned power receiving unit comprising: multiple power receiving coils arranged to have certain relative angles to one another in a parallel magnetic field generated by a power supply unit; a rectifier circuit connected to each of the power receiving coils; and an adder circuit configured to add DC power obtained from the plurality of power receiving coils through the rectifier circuits, and to output the added sum of power.

The electronic device may further comprise a secondary battery configured to store an added sum of DC power outputted from the adder circuit, or an electronic circuit configured to receive an added sum of DC power outputted from the adder circuit.

The electronic device is capable of: charging a secondary battery or supplying power to an electronic circuit by constant power generated by the power receiving unit; and thereby actuating the device by the power of the secondary battery.

Still another aspect of the invention provides a battery pack employing a contactless power receiving unit that comprises the power receiving unit comprising: a plurality of power receiving coils arranged to have certain relative angles to one another in a parallel magnetic field generated by a power supply unit, a rectifier circuit connected to each of the power receiving coils; an adder circuit configured to add DC power obtained, through the rectifier circuits, from the plurality of power receiving coils, and to output resultant DC power of the addition; and a secondary battery configured to store an added sum of DC power outputted from the adder circuit.

According to the configuration of above battery pack, it is possible to charge a secondary battery to provide electric power stably generated by the power receiving unit, so that the battery pack can be used as a power source for electrical devices.

Still another aspect of the invention provides a contactless power receiving unit that comprises: a first power receiving coil arranged in a first direction, configured to generate electromotive force from a parallel magnetic field; a second power receiving coil arranged to form a relative angle to the first direction, configured to generate electromotive force from the parallel magnetic field; a first rectifier circuit electrically coupled to the first power receiving coil, configured to convert electromotive force generated by the first power receiving coil into a first DC power; a second rectifier circuit electrically coupled to the second power receiving coil, configured to convert electromotive force generated by the second power receiving coil into a second DC power; and an adder circuit electrically coupled to the first and second rectifier circuits, configured to add the first DC power converted by the first with the second DC power converted by the second rectifier circuits, and configured to output the added DC power.

By employing the above configuration, constant induced voltage can be supplied to a load without causing a parallel rotating magnetic field to be generated by the power supply unit. Accordingly, only a simple configuration to generate a parallel magnetic field is necessary for the power supply unit. Incidentally, although multiple power receiving coils and multiple rectifier circuits are required for the power receiving unit, these components can be configured of passive circuit elements, which thus do not complicate the configuration of the unit.

As has been described above, a power receiving unit and an electronic device employing the same is provided. To be specific, the power receiving unit has a simple configuration and is capable of generating constant induced voltage regardless of the orientation of a power receiving coil.

DETAILED DESCRIPTION OF EMBODIMENTS

Figure 1:
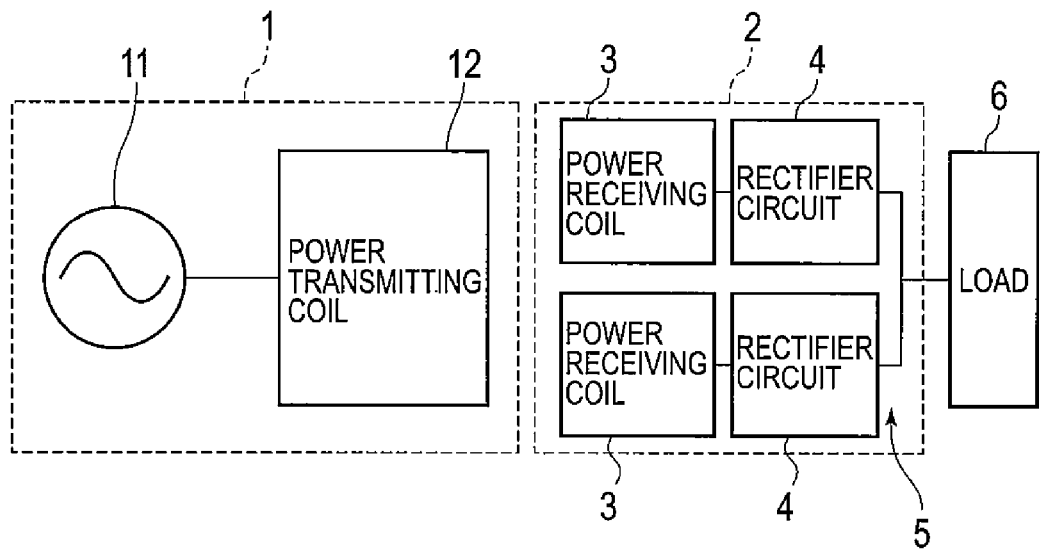
FIG. 1 is a block diagram showing a configuration of a power supply unit employing a power receiving unit of the present embodiment.
Figure 11A:
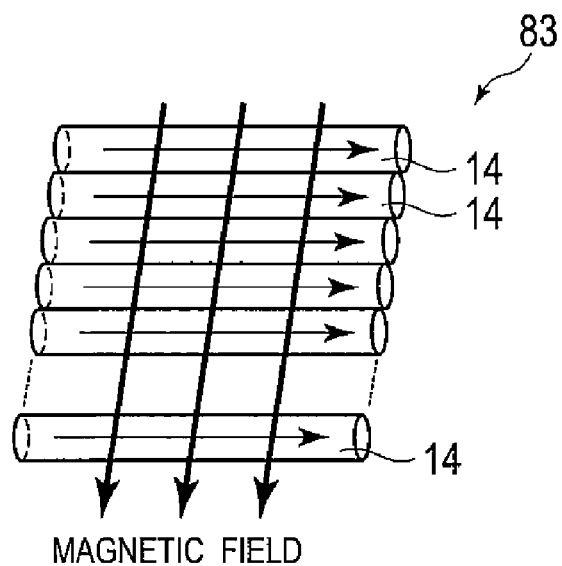
FIG. 11 is a diagram for describing the principle of generating a parallel magnetic field.
Figure 11B:
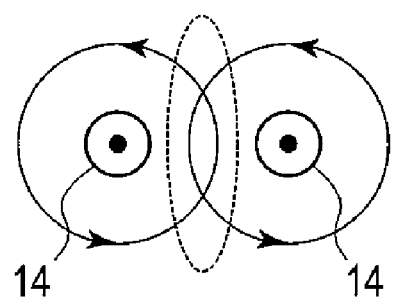
Figure 11C:
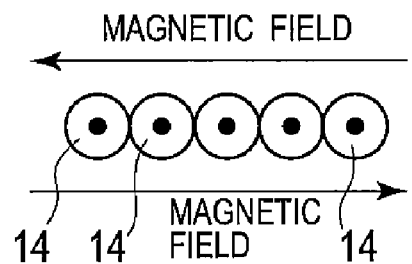
Figure 12:
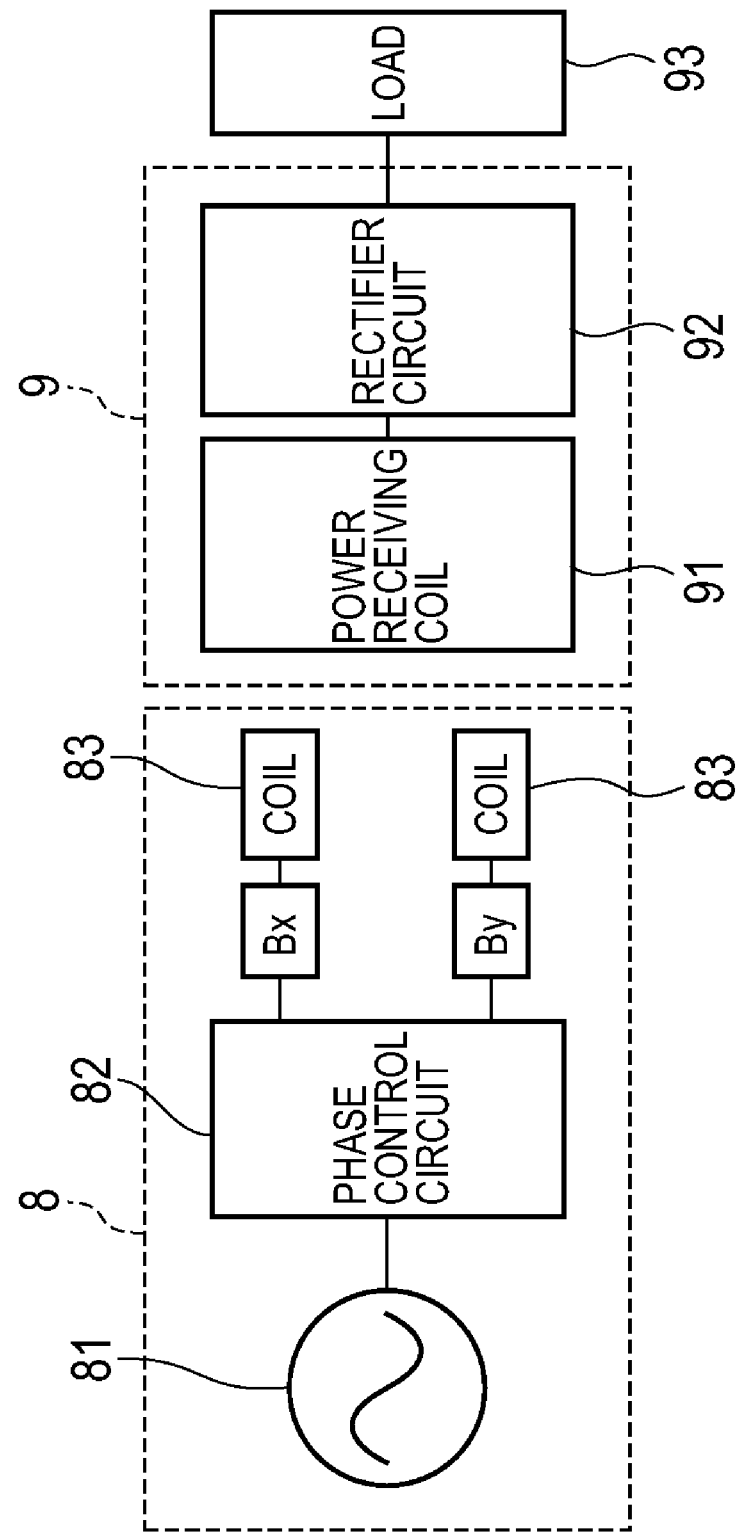
FIG. 12 is a block diagram showing a configuration of a conventional power supply unit.
Figure 13A:
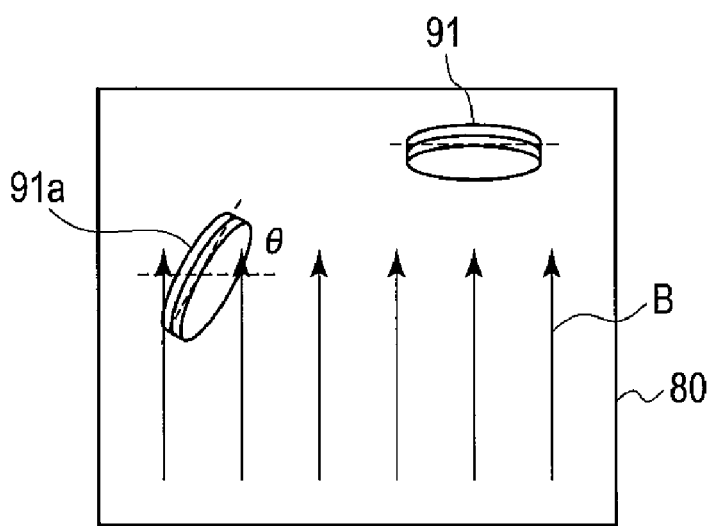
FIG. 13 is a diagram for describing an effect of a parallel rotating magnetic field in the conventional power supply unit.
Figure 13B:
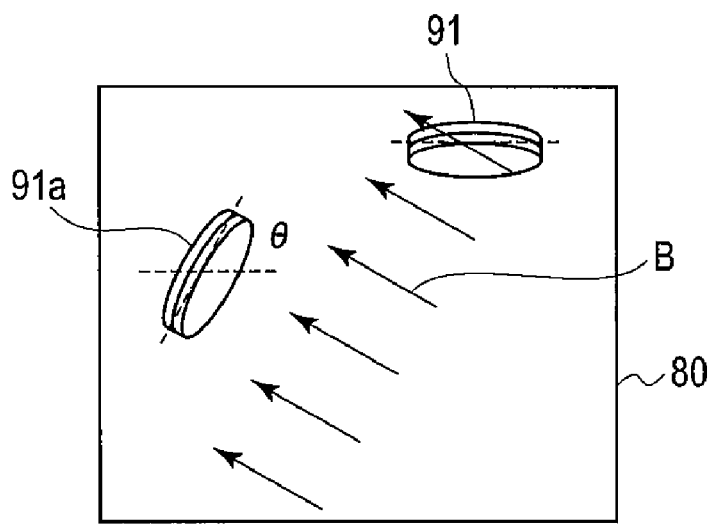
Figure 14:
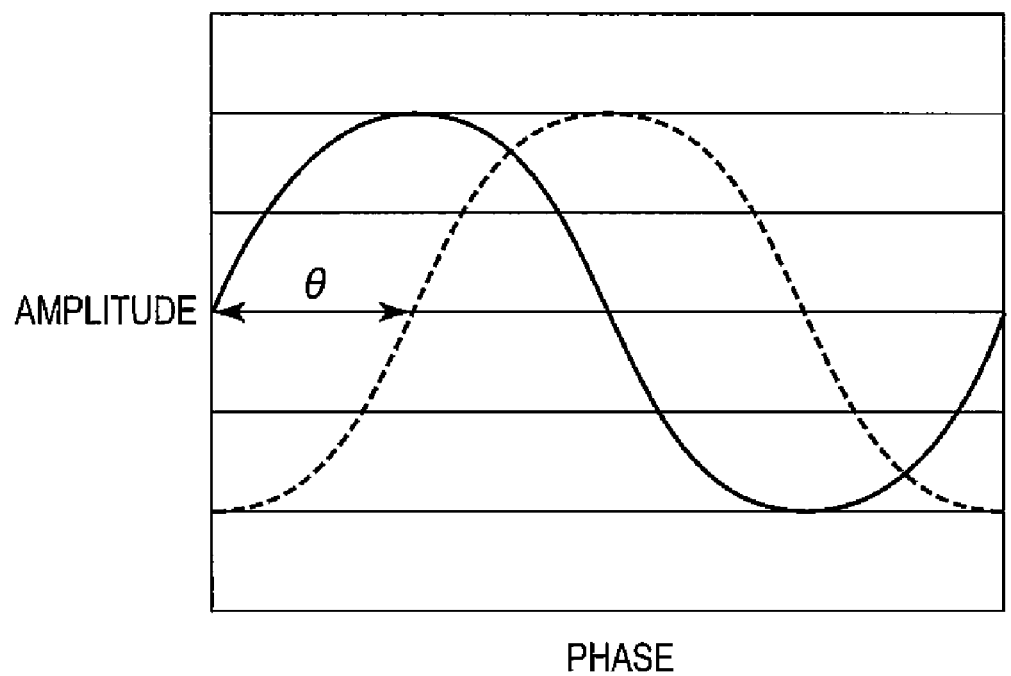
FIG. 14 is a graph for explaining a problem of the conventional power supply unit.

Hereinbelow, a specific description of an embodiment will be given with reference to the drawings. FIG. 1 shows a configuration of a power supply unit employing power receiving unit 2 of the embodiment. Power supply unit 1 has a simple configuration in which power transmitting coil 12 is connected to AC power source 11. Here, the configuration for generating a parallel magnetic field described above with reference to FIGS. 11A to 11C may be employed for power transmitting coil 12.

Meanwhile, as shown in FIG. 1, power receiving unit 2 includes: two power receiving coils 3; rectifier circuits 4 respectively connected to power receiving coils 3; and adder circuit 5 that adds the outputs of the two rectifier circuits 4. DC power obtained from adder circuit 5 is supplied to load 6. Incidentally, load 6 is an electronic circuit for actuating a secondary battery as a power source, or actuating an electronic device.

Figure 2:
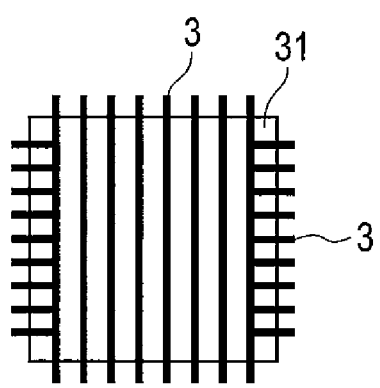
FIG. 2 is a plan view showing an arrangement example of two power receiving coils.
Figure 3:
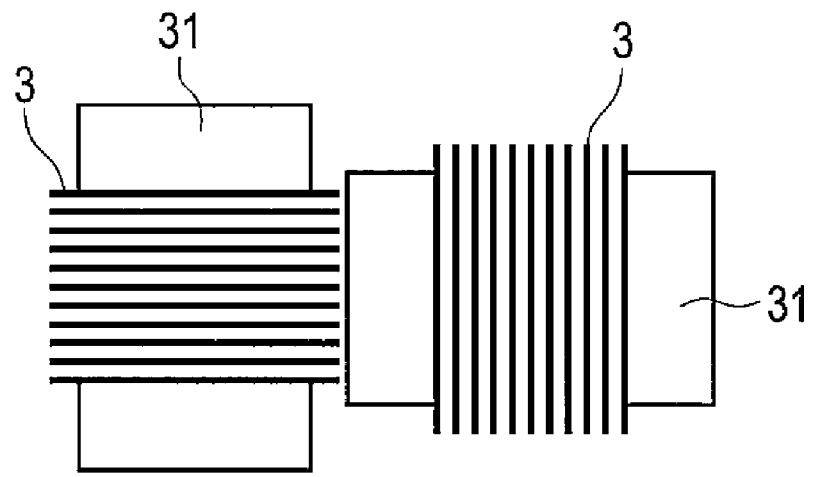
FIG. 3 is a plan view showing another arrangement example of two power receiving coils.
Figure 4:
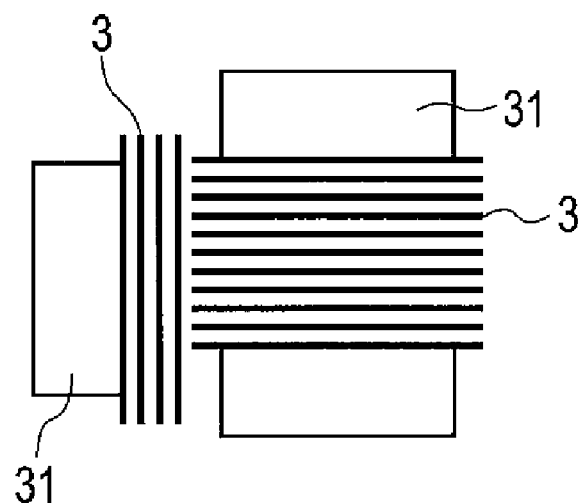
FIG. 4 is a plan view showing yet another arrangement example of two power receiving coils.

As shown in FIG. 2, a configuration may be employed in which two power receiving coils 3 are wound to common core 31 so as to be orthogonal to each other. In this case, two power receiving coils 3 may be wound alternately in a weaving manner. Otherwise, as shown in FIG. 3, a configuration may be employed in which two power receiving coils 3 are wound to individually different cores 31 arranged so as to be orthogonal to each other. Here, two cores 31 are arranged on the same plane. Otherwise, as shown in FIG. 4, two cores 31 may be arranged so as to overlap one another. In this case, the number of turns may be adjusted so that the added sum of voltages (absolute values) induced to the coils takes a constant value, with respect to any angle at which two power receiving coils 3 are arranged.

As described above, two power receiving coils 3 are arranged so that their coil axes are orthogonal to each other. With this configuration, power receiving unit 2 can supply a fixed amount of DC power to load 6, as will be described below, even if a direction of a parallel magnetic field generated by power supply unit 1 and each coil axis of two power receiving coils 3 shown in FIG. 1 are not arranged in parallel to each other.

Figure 5:
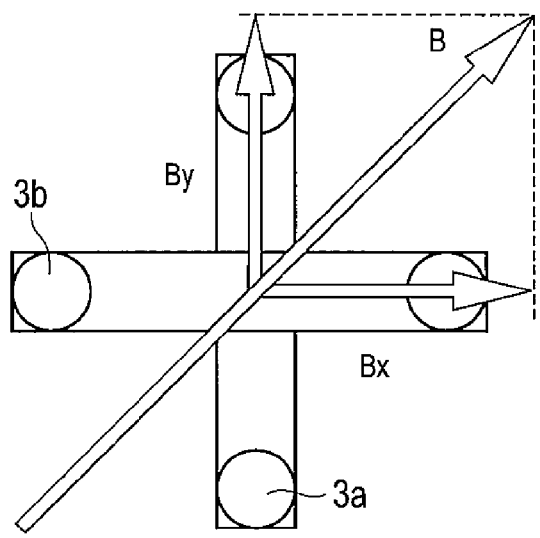
FIG. 5 is a diagram showing magnetic vector acting upon two power receiving coils.

For example, as shown in FIG. 5, assume that two power receiving coils 3 have certain inclination angles relative to a direction of a vector of parallel magnetic field B. In this case, magnetic-field component Bx acts upon one power receiving coil 3a, magnetic-field component Bx being a component into which the parallel magnetic field B is divided in a direction relative to the coil axis of power receiving coil 3a. Concurrently, magnetic-field component By acts upon the other power receiving coil 3b, magnetic-field component By being a component into which the parallel magnetic field B is divided in a direction relative to the coil axis of power receiving coil 3b. Accordingly, an induced voltage corresponding to the degree of magnetic-field component that acts thereupon is generated in each of power receiving coils 3.

Note that a parallel magnetic field in this embodiment refers to a magnetic field in which a parallel current plane (see FIG. 11A) is generated. Here, magnetic flux required for power reception may be bent depending on a state of power transmitting coil 12 or a distance from power transmitting coil 12. However, magnetic flux required for power reception can be received in the bent state, as long as the variation of the magnetic flux of parallel components can be sufficiently converted into electric power.

The induced voltage generated in each power receiving coil 3, that is, the magnetic field detected by each power receiving coil 3 is AC, which is the same as that obtained by dividing the original magnetic field. Accordingly, the AC induced voltage generated in each power receiving coil 3 may be rectified by use of rectifier circuit 4, as shown in FIG. 1. Thus, a DC voltage of the same volume as the induced voltage generated when coil axes of power receiving coils 3 are parallel to the parallel magnetic field can be obtained, by adding the DC voltages outputted from two rectifier circuits 4 by adder circuit 5.

Hence, by supplying the power obtained by power receiving unit 2 to load 6, a secondary battery acting as load 6 can be charged by a fixed amount of power or an electronic circuit can be actuated, regardless of the orientation of power receiving unit 2. Additionally, since a fixed amount of power is supplied to load 6 regardless of the elapsed time period, when a secondary battery is charged, for instance, no difference due to the orientation of power receiving unit 2 occurs in the charged amounts at arbitrary time points.

Note that power receiving unit 2 can be miniaturized by employing the configuration shown in FIG. 2 in which two power receiving coils 3 are wound to common core 31. Meanwhile, the unit can be made thinner while the distortion in the induced voltage can be made smaller than the configuration in FIG. 2, by employing the configuration shown in FIG. 3 in which two power reception coils 3 are wound to individually different cores 31. Further, mutual interference between power receiving coils 3 can be prevented, while miniaturization of power receiving unit 2 and suppression of the distortion in the induced voltage can be achieved, by employing the configuration shown in FIG. 4 in which two cores 31 overlap with one another.

Figure 6:
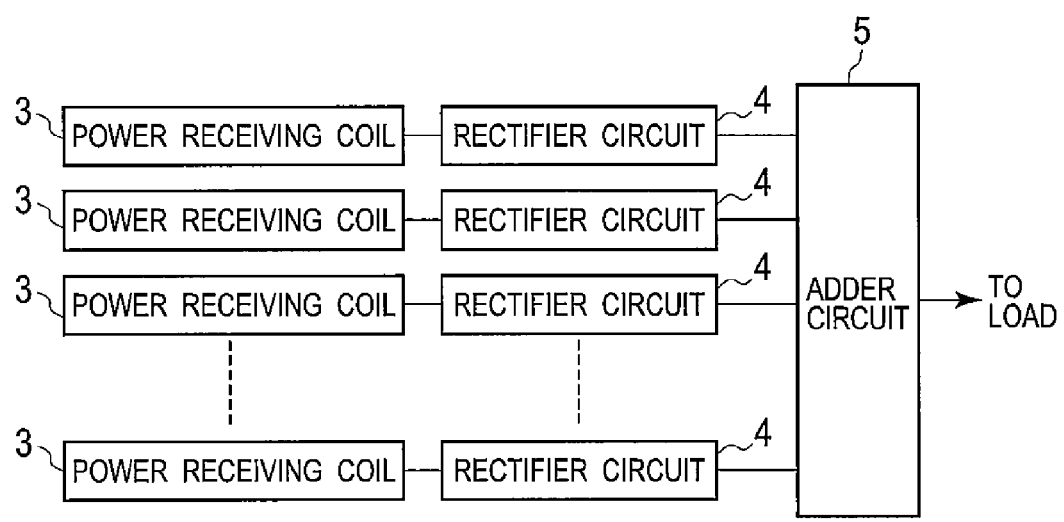
FIG. 6 is a block diagram of a configuration in which not less than three power receiving coils are arranged.

Although two power receiving coils 3 are provided to power receiving unit 2 in the above embodiment, another configuration may be employed in which: not less than three multiple power receiving coils 3 are provided as shown in FIG. 6, and rectifier circuits 4 are connected to respective power receiving coils 3, so that DC power obtained from rectifier circuits 4 is added by adder circuit 5. In this case, multiple power receiving coils 3 are preferably arranged to have the same angular differences between one another. This configuration allows power receiving unit 2 to efficiently receive power necessary for load 6 from the parallel magnetic field generated by power supply unit 1.

Figure 7:
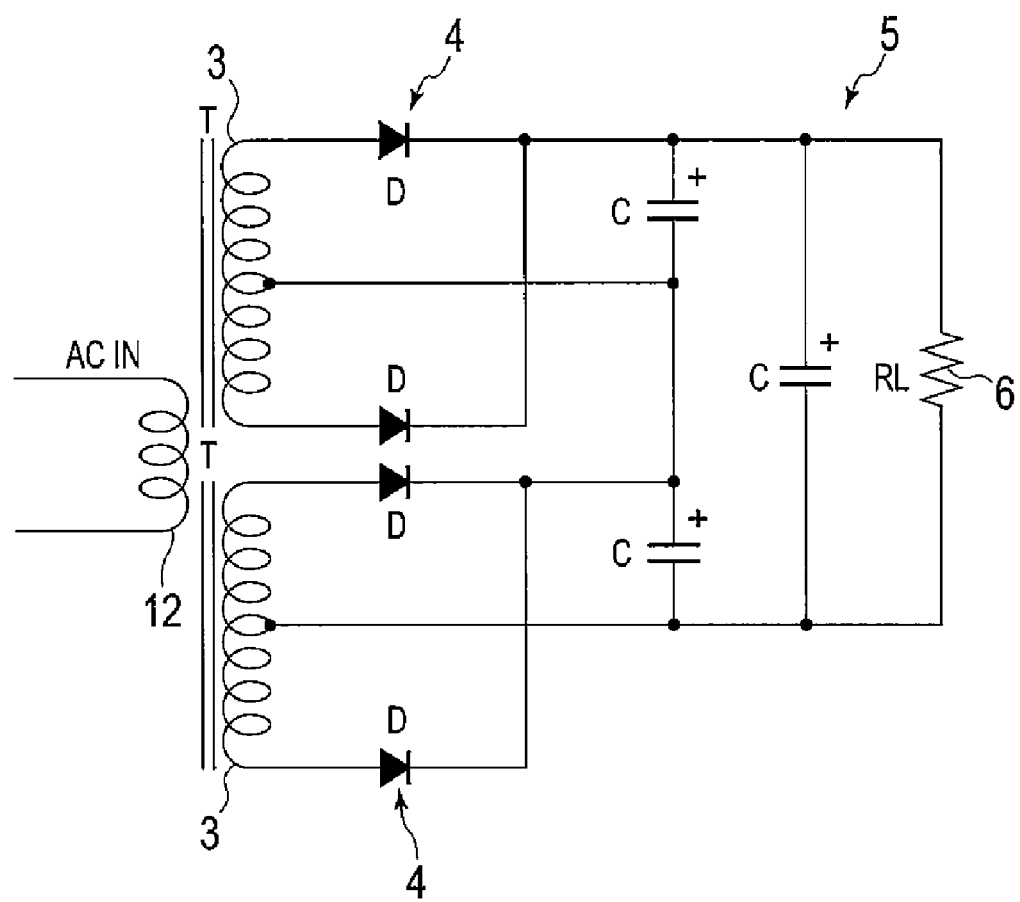
FIG. 7 is a specific circuit diagram of a rectifier circuit and an adder circuit.

As a configuration of rectifier circuit 4, a center-tapped full-wave rectifying circuit may be employed, in which a center tap is provided to each power receiving coil 3 as shown in FIG. 7. With this configuration, the number of diodes constituting rectifier circuit 4 is reduced.

Figure 8:
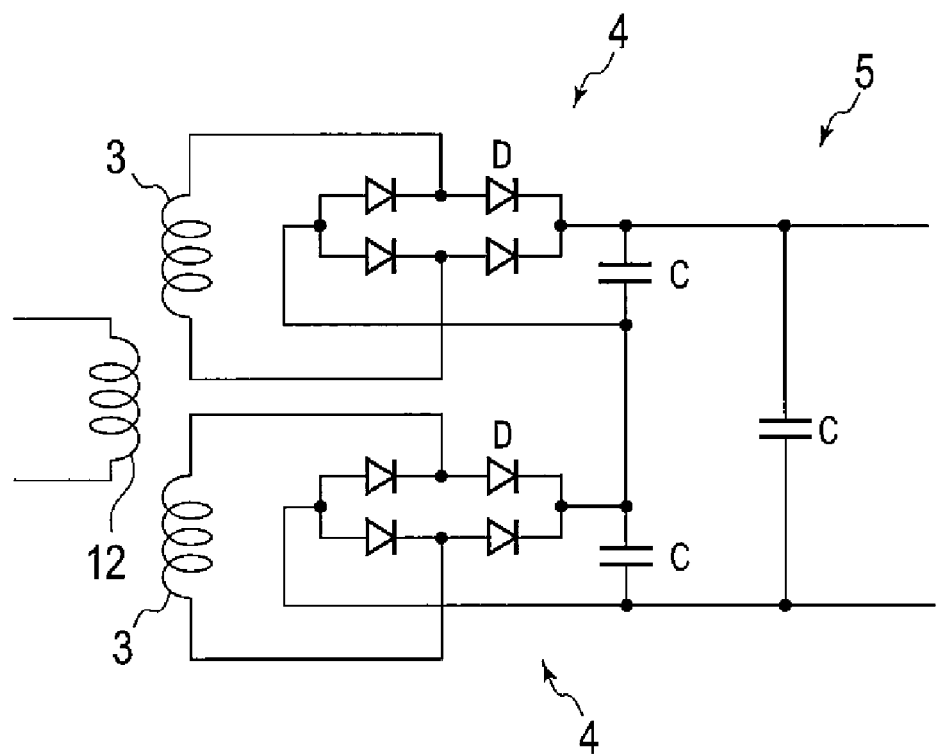
FIG. 8 is another specific circuit diagram of a rectifier circuit and an adder circuit.

As another configuration of rectifier circuit 4, a configuration may be employed, in which a diode bridge full-wave rectifying circuit is connected to each power receiving coil 3 as shown in FIG. 8. With this configuration, the inductance of power receiving coils 3 can be fully utilized, and thus a larger amount of power than a center-tapped full-wave rectifying circuit of the same size can be received.

Figure 9:
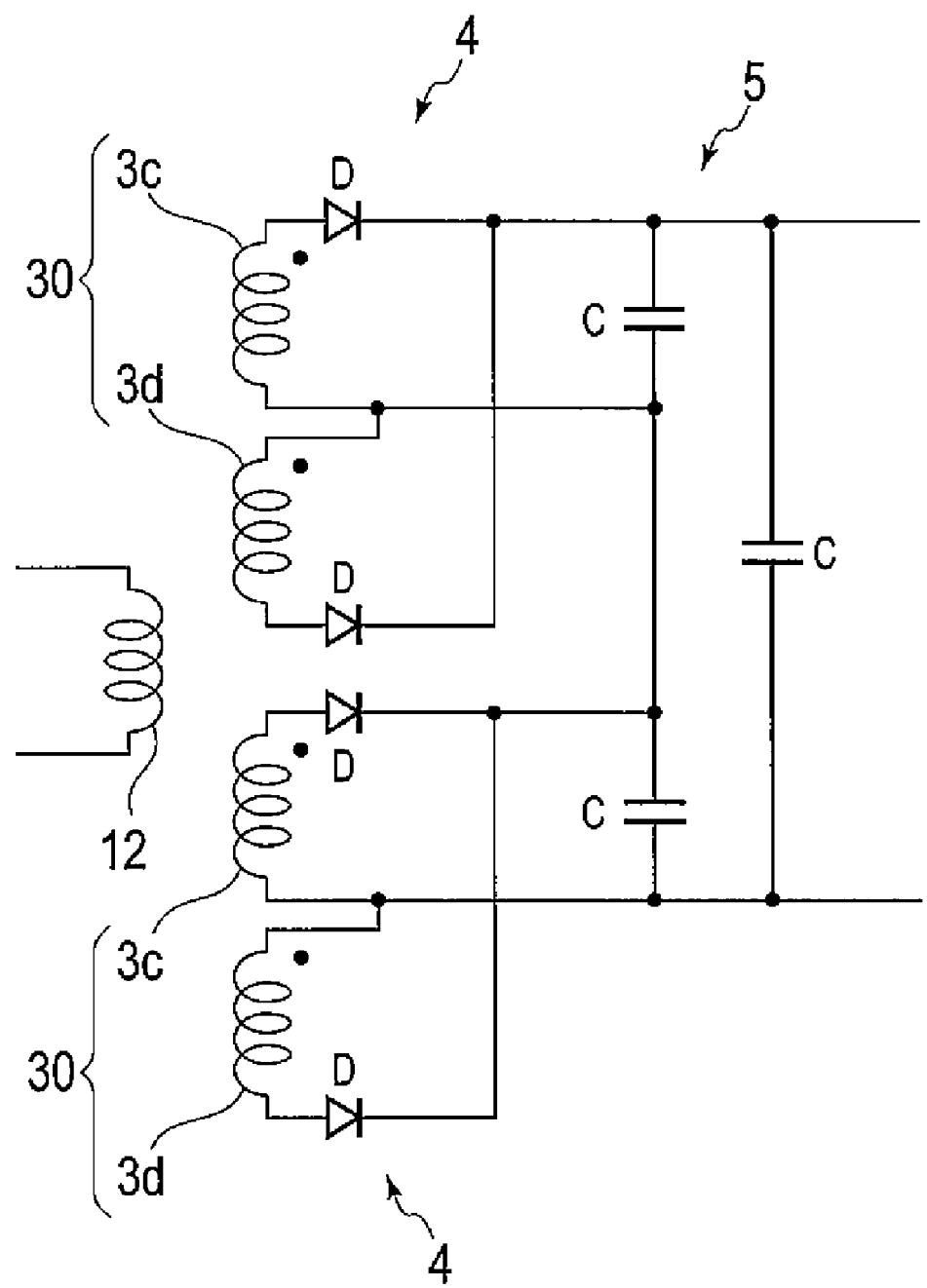
FIG. 9 is a circuit diagram of a rectifier circuit and an adder circuit of a power receiving unit equipped with four power receiving coils.

Moreover, as a configuration of arranging four power receiving coils 3, a configuration as shown in FIG. 9 may be employed. Here, coil sets 30 are each configured by arranging power receiving coils 3c and 3d of different polarities so that coil axes thereof are coaxial with each other, and two coil sets 30 are arranged to have a 90° angular difference therebetween.

Figure 10A:
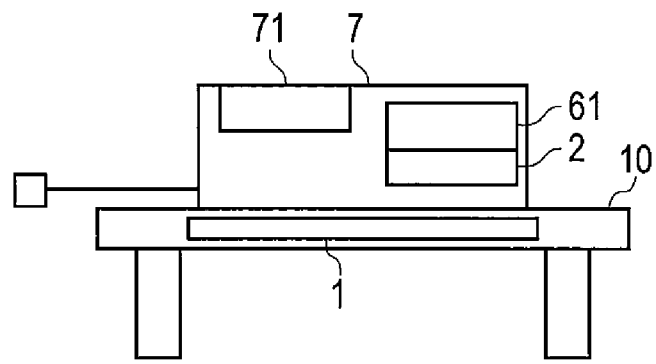
FIG. 10 is a diagram for describing various application examples of the present embodiment.
Figure 10B:
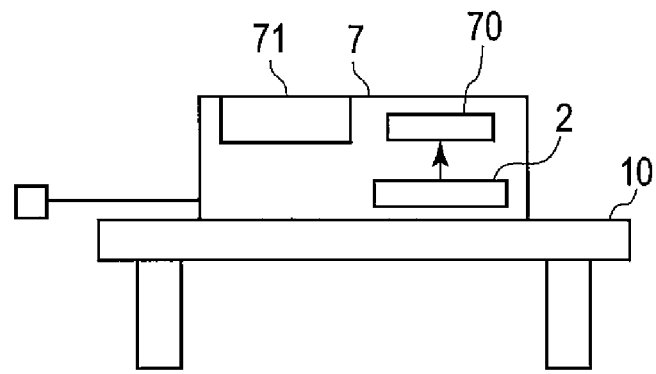
Figure 10C:
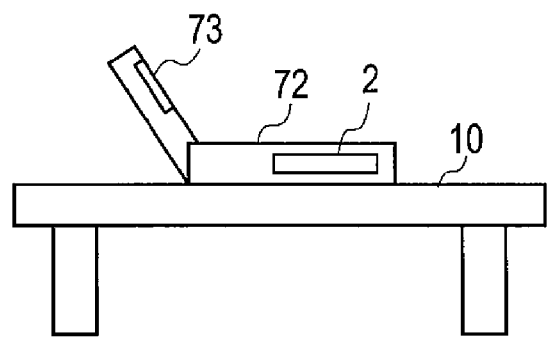

FIGS. 10A, 10B and 10C show application examples of power reception unit 2 of the above embodiment. In the application example in FIG. 10A, power receiving unit 2 is built in communication terminal 7 including display 71. Here, secondary battery 61 that is built in communication terminal 7 is charged by power receiving unit 2. At the time of charging, communication terminal 7 is placed on charging desk 10 that is built in power supply unit 1. According to the application example, communication terminal 7 can be actuated, with secondary battery 61 being used as a power source, by a process in which secondary battery 61 of communication terminal 7 is charged by a parallel magnetic field generated from charging desk 10. Note that, according to the application example, it is possible to charge secondary battery 61, as well as to supply power to electronic components constituting communication terminal 7.

In the application example shown in FIG. 10B, power receiving unit 2 is built in communication terminal 7 including display 71. Here, the power supplied from power receiving unit 2 is directly supplied to electronic circuit 70 to actuate communication terminal 7. Moreover, in the application example shown in FIG. 10C, power receiving unit 2 is built in information processor 72 including display 73. Here, information processor 72 is actuated, or a built-in battery is charged, by a parallel magnetic field generated from charging desk 10.

According to the application examples shown in FIGS. 10A, 10B and 10C, necessary power for load 6 can be received from the power supplied from power supply unit 1, regardless of the orientation of communication terminal 7 or information processor 72 on charging desk 10. Incidentally, in the case of a conventional unit where a single power receiving coil is provided, the amount of induced voltage differs depending on the angle at which the power receiving coil is arranged when the transmitting power is fixed to a certain amount. Hence, as the direction of the magnetic field becomes orthogonal to the coil axis, the power obtained on the power receiving side becomes smaller. In order to obtain a certain amount of power in the power receiving side in such a case, the power on the transmitting side needs to be increased. In the above embodiment, a stable power supply can be achieved by use of multiple coils, without adding a configuration to increase the power, on the power transmitting side, as required in the conventional device.

Configuration of the components of the present invention is not limited to the above embodiment, and various modifications can be added thereto. For example, in the application example in FIG. 10A, although power receiving unit 2 is built in communication terminal 7, the configuration is not limited to this. Instead, power receiving unit 2 may be configured to be externally connectable by use of an appropriate adapter. With this configuration, the power supply by use of power receiving unit 2 of the present embodiment may be applied to existing models, thereby allowing a user to select between a conventional charging scheme and a charge scheme using power receiving unit 2 of the embodiment.

The present embodiment is applicable not only to communication terminals and information processors, but also to any electronic devices that require electronic power supply. Moreover, a configuration may be employed in which the power receiving unit of the present embodiment is provided to a battery pack having a built-in secondary battery, and the secondary battery is charged by the power receiving unit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A contactless power receiving unit comprising:
a plurality of power receiving coils arranged to have certain relative angles to one another in a parallel magnetic field generated by a power supply unit;
a rectifier circuit connected to each of the power receiving coils; and
an adder circuit configured to add DC power obtained, through the rectifier circuits, from the plurality of power receiving coils, and to output the resultant DC power of the addition.

2. The unit of claim 1, wherein the number of the power receiving coils is two, and the two power receiving coils are arranged approximately 90° relative to each other.

3. The unit of claim 1, wherein the number of the power receiving coils is four, a coil set is configured of two coils having different polarities and being arranged in a manner that the coil axes thereof are coaxial with each other, and two coil sets are arranged approximately 90° relative to each other.

4. The unit of claim 1, wherein the plurality of power receiving coils are wound on individually different cores.

5. The unit of claim 1, wherein the plurality of power receiving coils are wound on the same core.

6. An electronic device employing a contactless power receiving unit comprising:
a power receiving unit comprising:
a plurality of power receiving coils arranged to have certain relative angles to one another in a parallel magnetic field generated by a power supply unit;
a rectifier circuit connected to each of the power receiving coils; and
an adder circuit configured to add DC power obtained from the plurality of power receiving coils through the rectifier circuits, and to output resultant DC power of the addition.

7. The device of claim 6, further comprising:
a secondary battery configured to store the resultant DC power of the addition outputted from the adder circuit.

8. The device of claim 6, further comprising:
an electronic circuit configured to receive the resultant DC power of the addition outputted from the adder circuit.

9. A battery pack employing a contactless power receiving unit comprising:
the power receiving unit comprising:
a plurality of power receiving coils arranged to have certain relative angles to one another in a parallel magnetic field generated by a power supply unit;
a rectifier circuit connected to each of the power receiving coils;
an adder circuit configured to add DC power obtained, through the rectifier circuits, from the plurality of power receiving coils, and to output resultant DC power of the addition; and
a secondary battery configured to store an added sum of DC power outputted from the adder circuit.

10. A contactless power receiving unit comprising:
a first power receiving coil arranged in a first direction, configured to generate electromotive force from a parallel magnetic field;
a second power receiving coil arranged to form a relative angle to the first direction, configured to generate electromotive force from the parallel magnetic field;
a first rectifier circuit electrically coupled to the first power receiving coil, configured to convert electromotive force generated by the first power receiving coil into a first DC power;
a second rectifier circuit electrically coupled to the second power receiving coil, configured to convert electromotive force generated by the second power receiving coil into a second DC power; and
an adder circuit electrically coupled to the first and second rectifier circuits, configured to add the first DC power converted by the first with the second DC power converted by the second rectifier circuits, and configured to output the added DC power.

11. The unit of claim 10, wherein the first power receiving coil and the second power receiving coil are arranged approximately 90° relative to each other.

12. The unit of claim 10, wherein the first power receiving coil and the second power receiving coil are wound on individually different cores.

13. The unit of claim 10, wherein the first power receiving coil and the second power receiving coil are wound on the same core.

14. The unit of claim 13, wherein the first power receiving coil and the second power receiving coil are wound on the same core in a weaving manner.

15. The unit of claim 10, wherein the first power receiving coil and the second power receiving coil are arranged on the same plane.

16. The unit of claim 10, wherein the first power receiving coil and the second power receiving coil are arranged on individual planes.

17. The unit of claim 10, further comprising:
a third power receiving coil arranged in a second direction, configured to generate electromotive force from a parallel magnetic field;
a fourth power receiving coil arranged to form a relative angle to the second direction and configured to generate electromotive force from the parallel magnetic field;
a third rectifier circuit electrically coupled to the third power receiving coil, configured to convert electromotive force and generated by the third power receiving coil into a third DC power; and
a fourth rectifier circuit electrically coupled to the fourth power receiving coil, configured to convert electromotive force generated by the fourth power receiving coil into a fourth DC power, wherein
the adder circuit is electrically coupled to the first, second, third and fourth rectifier circuits, and adds the first DC power converted by the first rectifier circuits, the second DC power converted by the second rectifier circuits, the third DC power converted by the third rectifier circuits, and the fourth DC power converted by the fourth rectifier circuits, and is configured to output the added DC power.

* * * * *